Dec. 23, 1952        G. KUNETZ        2,623,097

METHOD FOR THE ELECTRIC PROSPECTION OF THE SUBSOIL

Filed May 20, 1948        3 Sheets-Sheet 1

Inventor:
Geza Kunetz
By: Campbell, Brumbaugh, Free & Graves
His Attorneys

Patented Dec. 23, 1952

2,623,097

UNITED STATES PATENT OFFICE 2,623,097

METHOD FOR THE ELECTRIC PROSPECTION OF THE SUBSOIL

Géza Kunetz, Issy-les-Moulineaux, France, assignor to Compagnie Generale de Geophysique, Paris, France, a corporation of the French Republic Application May 20, 1948, Serial No. 28,263
In France May 20, 1947

6 Claims. (Cl. 175—182)

My invention has for its object improvements in the electric prospection of the subsoil based on the study of the electric currents or fields appearing spontaneously in the ground such as telluric currents, stray currents and the like to the exclusion of any artificial field produced for the need of the above prospection.

I have described in my copending specification Serial No. 670,101, filed May 16, 1946, now Patent No. 2,586,667, issued February 19, 1952, claiming priority of the French patent of February 27, 1946, in the name of Compagnie Generale de Geophysique and entitled "Improvements in the Methods for the Electric Prospection of the Subsoil," a method for electric prospection based on the comparative study of the variations of the telluric fields at different stations and making use in particular of a basic or reference station, said comparative study being based on the fact that the telluric field at a measuring station is a linear function of the telluric field existing at the same moment at a basic station.

In other words if $x$ and $y$ are the components of the field M at the measuring station along two axes while $x_1$ and $y_1$ are the components of the corresponding field at P at the same moment along two other axes of any direction (Figs. 1A and 1B), the following relationships binding $x$ and $y$ to $x_1$ and $y_1$ will hold true $$x = ax_1 + by_1$$
$$y = cx_1 + dy_1 \qquad (1)$$

these relationships remaining unaltered whatever the values of $x_1$, $y_1$, $x$, $y$, at least if $x$, $y$, $x_1$, $y_1$ are the average values obtained after a sufficiently long time.

Provided the coefficients $abcd$ or practically certain invariants of the transformation given out by the relationship (1) are known, it is possible to characterize each measuring point with reference to the basic station and to establish consequently maps providing indications as to the structure of the subsoil.

My invention allows reaching still further and obtaining still more accurate and complete results as to the nature of the subsoil through the study of the telluric currents. It allows establishing also measuring means that are independent of any interpretation by the operator.

Said invention is based on the following experimental facts: considering at a given station the vectors corresponding to the variations of the telluric currents, it is found, if observation has continued for a sufficient time that the ends of these vectors are distributed as an average on an ellipse and that the directions of the vectors are unequally distributed round the centre of the stations, the vectors being closer together near the direction of the major axis of the ellipse than in the direction of the minor axis; the law of distribution is such that the probabilty for one of said vectors to lie inside a predetermined angle is proportional to the square of the corresponding vector radius. It is found furthermore that the direction of the major axis of said ellipse that will be termed hereinafter the intrinsic ellipse and also its eccentricity, i. e. the ratio between its major axis and its minor axis, depend on the nature of the ground and subsoil and that when they are known, it is possible to draw conclusions as to the nature of said ground and subsoil.

In particular, in the case where the intrinsic ellipses show a considerable eccentricity, this may correspond for instance to the presence of a resisting anticline perpendicular to said major axis or else to a zone of higher conductivity parallel to said axis.

When observations are made during a more or less long time or at different periods, it is found furthermore that on one hand the direction of the axes of the intrinsic ellipse and its eccentricity are data that are almost permanent, said data being all the more unvarying when the measures are considered over longer intervals of time and, on the other hand, the very size of said ellipse is submitted to much more important variations. This may be foreseen before any experimentation, as it is well known that the intensity of the telluric currents is submitted to variations having a more or less considerable period and consequently the averages to be observed depend on the duration of operation and on the moments at which they have been executed. However, experience shows that whatever may be the duration of observation, the ratio between the area of the intrinsic ellipse as defined at the measuring station and the area of the corresponding intrinsic ellipse as defined during the same period of observation at a basic station remains constant. This ratio corresponds furthermore to the area constant appearing in the prior co-pending specification and which I will term hereinafter the relative area in order to remove any ambiguity.

A further ratio that is of interest for defining the nature of the subsoil is the ratio between the radii of the circles that are orthoptic to the intrinsic ellipses at the measuring station and at the basic station, said ratio however remaining constant and having consequently a signification only when the shapes of the intrinsic ellipses remain themselves unvarying.

My invention consists therefore in defining through the observation of the variations in the telluric currents intrinsic ellipses or at least certain data concerning said ellipses, such as the direction of their axes, their eccentricity and their relative area, the ratio between the radii of the orthoptic circles and the like.

Such a definition may be executed directly through the observation of a certain number of variations in the telluric currents as measured for instance by their projection on two axes rectangular or otherwise, as obtained by means of electric lines laid along the directions of said axes and allowing the drops in potential to be measured between points of the ground at predetermined distances from one another.

The distribution of the ends of the vectors corresponding to said variations of the telluric currents may then allow, in conformity with the invention, defining the ellipse itself or certain of its properties. If measurements have been made during the same period at a basic station, it will also be possible to define the relative area or the ratio between the radii of orthoptic circles. This method however is comparatively intricate.

It is possible, according to my invention, to obtain a definition of the ellipse in a much simpler manner, that is based on the examination of the total variations of the diagrams recorded that correspond to projections of the telluric current vectors on two perpendicular axes.

It is known that the total variation of a curve or a diagram illustrating the modifications of a univocal function within a predetermined interval is the sum of the absolute values of the differences in ordinates between all successive relative peak and minimum values, including the values assumed by the function at both ends of the interval, of said function in said interval.

It has been found that the total variation of the diagram of the projection of the telluric current vector on an axis is proportional to the projection of the intrinsic ellipse on said axis, that is the distance between the tangents to the intrinsic ellipse that are perpendicular to said axis. Now if the total variations of the diagram recorded along three axes are measured, it is possible as a matter of fact to define three tangents to the ellipse the centre of which is located at the measuring station. Further, it is a known fact that, when three tangents are known, this is sufficient for completely defining an ellipse the centre of which is known. The intrinsic ellipse is thus defined except for the ratio of homothetic similarity.

The method according to my invention will consist consequently in measuring the total variations of the diagrams recording the projections of the variations of the telluric current along three predetermined directions and making use of the measures obtained either graphically or mechanically for defining the intrinsic ellipse or certain data relating thereto. In practice, it will not be indispensable to record the diagram of the projections of the telluric variations along three lines. It is sufficient to measure them as precedingly along two axes, preferably rectangular if the ground allows this manner of operating.

As a matter of fact, when the projections of a vector that is variable with time along two predetermined axes are known, said vector is completely defined. Supposing $x$ and $v$ are the projections of said vector on the two first axes, any amount $z=ux+vy$, $u$ and $v$ being constants, remains when time elapses proportional to the projection of the vector on a third direction $Oz$ of which it is easy to define the direction. Consequently, when the diagrams of the variations of the projection of the vector along two axes are obtained, the variations of its projection along a third direction may be obtained very easily. Having drawn this further diagram solely through the information given by the $x$ and $y$ diagrams, it is possible to define the total variations of the sum or difference between the records of the projections on the two axes considered. If the two records $x$ and $y$ are at the same scale, the further axis $oz$, Fig. 1A, will then correspond to either bisecting line. If as frequently occurs in practice, the two records of $x$ and $y$ are not at the same scale, their sums or differences correspond to projections along directions that depend on the ratio between the scales. When the total variations of the diagrams recorded along the directions $ox$—$oy$—$oz$ have been defined, it is possible, as disclosed hereinabove, to easily obtain the intrinsic ellipse itself. If certain features of said ellipse such as its area for instance are desired, it is not necessary to proceed with the actual drawing of said ellipse. The area may according to my invention be directly obtained through calculation, its value being in the case of rectangular axes $ox$ and $oy$:

$$A = \frac{1}{2}\sqrt{[(X+Y)^2 - 2Z^2][2Z^2 - (X-Y)^2]}$$

X, Y and Z designating respectively the total variations of the diagrams recorded along the directions $ox$—$oy$—$oz$, Fig. 1A. In this latter case, the characteristic value or invariant is no longer the area of the intrinsic ellipse itself but the ratio between the area of the intrinsic ellipse at the measuring station and that of the intrinsic ellipse at the basic station, said ratio having been defined precedingly as the relative area.

As disclosed hereinabove, further interesting values to be obtained are the radii of the orthoptic circles of the intrinsic ellipses at the measuring station and at the basic station. Now these radii can be obtained in an extremely simple manner by measuring the total variations without it being necessary to draw the tangents to the intrinsic ellipses. These radii are as a matter of fact proportional to the square root of the sum of the squares of the total variations of the diagrams along two perpendicular lines. They are thus obtained immediately by measuring the total variations of the diagrams recorded and may be considered as the absolute values of the total variation vector, the projections of which on the axes are constituted by the total variations of the diagrams on each axis. For this reason it will be called hereinafter the total variation vector.

In order to allow the invention to be better understood as far as its object and features are concerned and also the manner of executing same in practice, I have given hereinafter by way of example and by no means in a limiting sense two particular examples of application of such an invention.

Figs. 1A and 1B illustrate the telluric field vectors and several components thereof at two different locations, respectively, on the surface of the earth.

Fig. 6 shows the intrinsic ellipse resulting from the knowledge that is obtained of the total variations along the four directions $ox$–$oy$–$oz$–$ot$.

It should be noticed moreover that as stated hereinabove the knowledge of the values of the total variations along three directions is sufficient for defining the intrinsic ellipse. The definition of the total variation along a fourth direction such as $ot$, for instance, serves for cross-checking.

Fig. 7 shows a measuring arrangement adapted to measure in practice the total variations along two perpendicular lines and along a line at 45° with reference to the two others.

Figure 8:
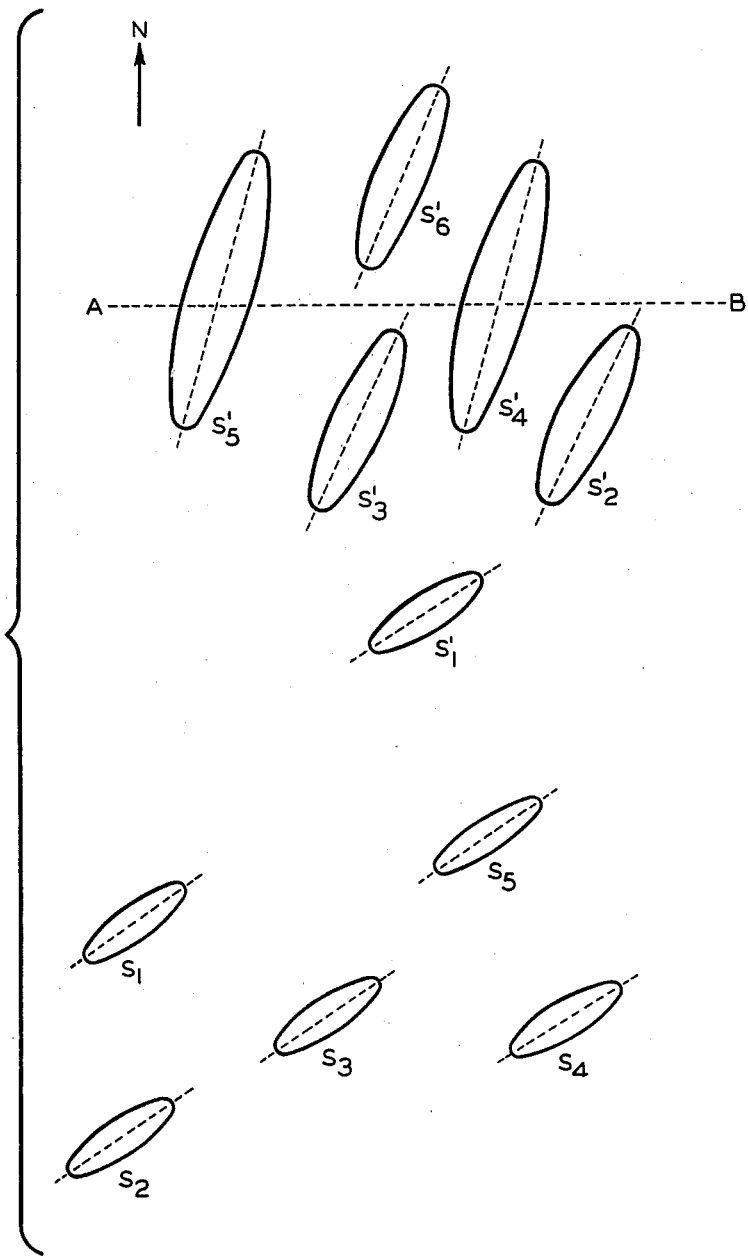

Lastly, Fig. 8 illustrates a typical map on which have been plotted at different locations corresponding to different measuring stations established in a field of interest, intrinsic ellipses made in accordance with the invention.

Figure 1:
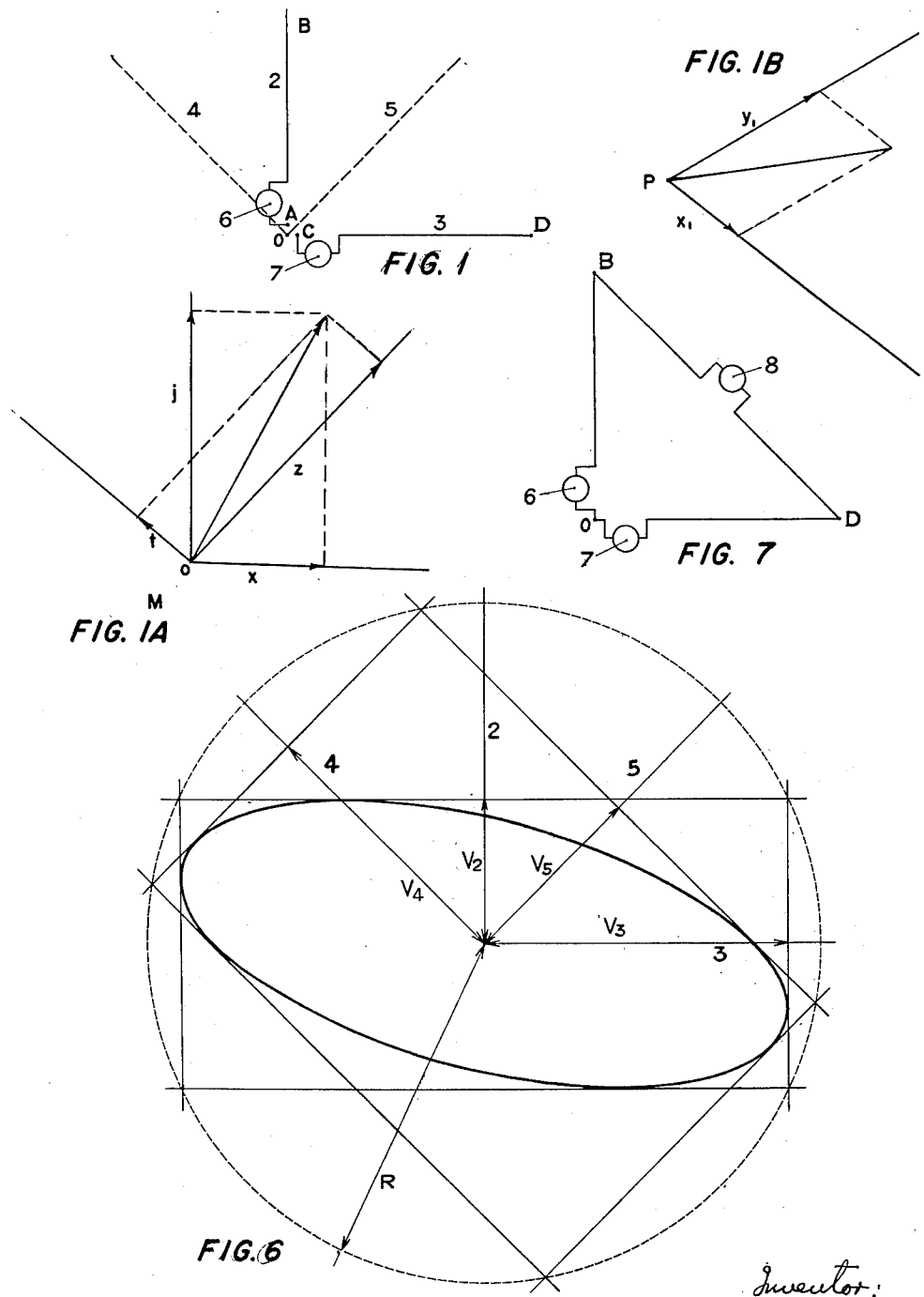
Fig. 1 shows the arrangement of electric lines adapted to measure variations in the telluric field according to time along two perpendicular lines for instance.

Turning to Fig. 1, AB and CD show the two electric lines arranged preferably at right angles, that serve for measuring and recording the variations of the telluric currents during a predetermined time interval. To this purpose, each line includes two electrodes: A and B on one hand, CD on the other, that are grounded and connected by two electric lines 2 and 3 which latter are associated in the usual manner with instruments 6 and 7 adapted to record the variations in the differences of potential between the points A and B on one hand and C and D on the other. The electrodes AB are spaced apart in a direction corresponding to the axis $oy$ of Fig. 1A, while the electrodes C and D are spaced apart in a direction corresponding to the axis $ox$ of Fig. 1A.

Figure 2:
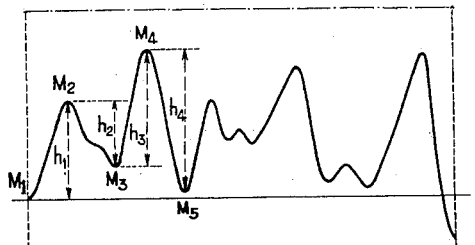
Fig. 2 is a curve illustrating the time variation of the component of the telluric current vector in the direction of the electrodes CD of Fig. 1.
Figure 3:
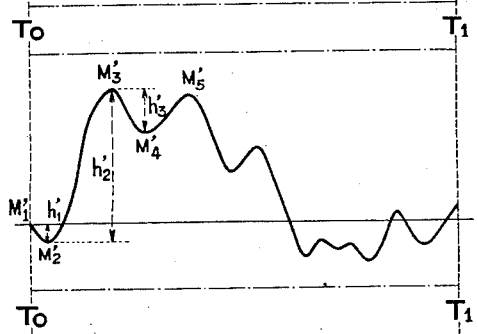
Fig. 3 is a diagram illustrating the time variation of the component of the telluric current vector in the direction of the electrodes AB of Fig. 1.

These records provide for instance between the times T0 and T1, the diagrams illustrated in Figs. 2 and 3. The differences in ordinates of these two diagrams are at every moment proportional to the variations of the telluric currents appearing in the corresponding lines. In the example illustrated it will be supposed for greater simplicity that the diagrams are shown at the same scale, which corresponds to the fact that:

The lines AB and CD or lines 2 and 3 have the same length.

The recording instruments operate with the same sensitivity.

Now if we examine the diagram of Figs. 2 and 3, each of them shows a succession of relative peaks and minimums including the ends of each diagram, M1, M2, M3, M4 and M'1, M'2, M'3, M'4. On said diagrams the points M1, M2, M3, M4 show differences in ordinates $h1$—$h2$—$h3$—$h4$ and the points M'1—M'2—M'3—M'4 differences in ordinates $h'1$—$h'2$—$h'3$—$h'4$.

The total variation V2 of Fig. 2 between the times T0 and T1 will be $$V2 = h1 + h2 + h3 + h4 + \ldots$$

and the total variation V3 on the diagram of Fig. 3 between the same times T0 and T1 will be similarly $$V3 = h'1 + h'2 + h'3 + h'4 + \ldots$$

Figure 4:
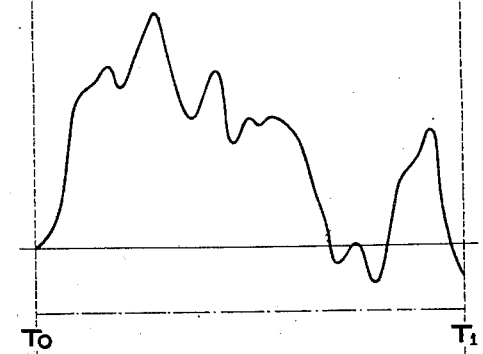
Fig. 4 is a graph, the ordinates of which for each abscissa value are equal to the sum of the ordinates of the curves of Figs. 2 and 3 for the corresponding abscissa value.
Figure 5:
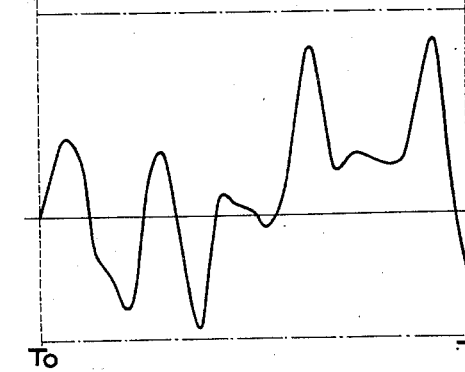
Fig. 5 is a diagram in which the ordinates for each abscissa value are equal to the difference between the ordinates of the curves in Figs. 2 and 3 for the corresponding abscissa value.

Figs. 4 and 5 illustrate the diagrams providing respectively the sums and the differences between the corresponding ordinates of the diagrams of Figs. 2 and 3. These diagrams may be established very simply through graphic means by carrying over each abscissae an ordinate equal to the sum or difference of the corresponding ordinates of Figs. 2 and 3. As in the case of the two other diagrams the total variations V4 and V5, are determined, the summation of the ordinates in each case being divided by the square root of two.

As disclosed precedingly, by reason of the lines AB and CD being orthogonal and the diagrams 2 and 3 being drawn at the same scale, the diagrams of Figs. 4 and 5 will give, except for a multiplying factor $\sqrt{2}$, the projection of the intrinsic ellipse on the two lines 4 and 5 bisecting the angle between the axes along which are laid the connection wires AB and CD. As a matter of fact, if at any given instant $x$ and $y$ are the components along the $ox$ and $oy$ axes of Fig. 1A, of the telluric current vector OM, it can easily be shown that $x+y$ and $y-x$, respectively, are equal to $z\sqrt{2}$, and $t\sqrt{2}$, where $z$ and $t$ are the components along the $oz$ and $ot$ axes, respectively, of the vector OM.

In Fig. 6, I have shown a diagram executed in accordance with the data of Figs. 2–3–4–5 and showing the position of the tangents to the intrinsic ellipse, which position is defined by the value of the total variations in Figs. 2–3–4–5; said tangents allow drawing the intrinsic ellipse in accordance with usual geometrical methods.

In Fig. 6, axes are drawn that are parallel to the directions 2—3—4—5, that is to the lines AB and CD of Fig. 1 and their two bisecting lines and lines are drawn that are parallel to said different axes to either side thereof at distances therefrom that are equal respectively to V2—V3—V4—V5. This provides a group of eight tangent lines that are symmetric two by two with reference to the centre O and inside which the ellipse is inscribed; as stated hereinabove, six tangent lines serve for defining the ellipse, and the last two serve for checking purposes. This Figure 6 shows also the orthoptic circle of the ellipse that may in fact be defined without drawing the ellipse itself. It is sufficient to remark that its radius R is equal to $\sqrt{V2^2 + V3^2}$. In practice, in certain cases this simple definition of R may be sufficient for establishing maps providing data concerning the geological structure of the subsoil and it may be substituted to advantage in various cases for the definition of the relative area of the ellipse. This is the case in particular when the intrinsic ellipses are very elongated, which makes it difficult to accurately measure their area. Furthermore, the definition of the total variation vector is as disclosed comparatively easier than the definition of the relative area.

Of course, it is possible to bring numerous modifications to the method disclosed without unduly widening the scope of the invention as defined in accompanying claims. In particular insead of defining graphically the values of the projections along the bisecting lines of the measuring axes, this definition may be obtained through the direct recording of the amounts $(x+y)$ and $(x-y)$ mentioned hereinabove. It is sufficient for such a purpose to provide for instance, in addition to the two measuring instruments 6 and 7 further measuring instruments such as double winding recording galvanometers that allow measuring in a known manner the sum or difference of the two currents.

Furthermore, as illustrated in Fig. 7 and in the case where the projections of the telluric current are measured through methods resorting to potentiometers for instance, I may operate in the following manner:

The points A and C being both merged into one at point O, diagrams are recorded that provide the variations in the drops of potential not only between O and B and O and D through the agency of the measuring instruments 6 and 7 but also between B and D by means of a further measuring instrument 8. This will provide consequently for the actual recording of three diagrams along three directions.

In practice, it is possible to obtain similar conditions if the electrical resistances of the circuits AB—AD and BD are very high with reference to the grounding resistances at A–B–D. In such a case the potentiometric measurements may be replaced by mere galvanometric measurements.

On the other hand, as disclosed precedingly, the method is applicable also when the lines AB and CD are not orthogonal and when the diagrams are not recorded on the same scale. Even in this case, it is possible to measure as already stated, the total variations of the diagrams, recorded in order to execute an ellipse according to the graphic methods disclosed and once the ellipse has been drawn it is possible to obtain therefrom the true intrinsic ellipse.

As concerns the definition of the total variation of each diagram that is recorded or established subsequently, it may be obtained, according to my invention, in any suitable manner, either graphically as described hereinabove or semi-mechanically by means of instruments similar to integrating instruments or else in a wholly automatic manner by means of meters while measurements are being carried out.

A portion of a typical map on which are plotted, at different locations corresponding to different measuring stations established in a particular field, intrinsic ellipses determined by means of the methods described above, is shown in Fig. 8. In the lower part of the figure the intrinsic ellipses drawn at the stations $S_1$, $S_2$, $S_3$, $S_4$ and $S_5$ are substantially identical. It can be deduced, therefore, that these five stations are situated in a zone where the thickness of the conductive formations is sensibly constant. The fact that the major axes of the ellipses extend in the southwest-northeast direction indicates that the earth current, as a whole, can circulate more easily in that direction than in the perpendicular direction. The interpretation of this portion of the figure, therefore, is that the zone in which the ellipses $S_1$, $S_2$, $S_3$, $S_4$ and $S_5$ lie is part of a basin extending generally in the southwest-northeast direction.

In the upper part of Fig. 8, the intrinsic ellipse at the station $S'_1$ is substantially identical with the five ellipses in the lower part of the figure indicating that this station is still part of the calm zone containing the stations $S_1$ to $S_5$. Continuing northwards, however, it is observed that the major axes of the ellipses increase in length and their directions turn towards the north. The maximum lengthening and the maximum rotation of the major axes are obtained on the line AB. Beyond this line the lengthening and rotation of the axes decrease. It is concluded, therefore, that the line AB represents the peak of an accident (i. e., an anticlinal) on which the thickness of the conductive soils is noticeably reduced.

It can be remarked accurately that the ellipses $S'_2$ and $S'_3$ differ from the ellipse $S'_1$ in that they are enlarged in the direction perpendicular to AB and by a factor of 2. Similarly, the ellipses $S'_4$ and $S'_5$ differ from the ellipse $S'_1$ in that the former are also enlarged in the same direction but by a factor of 3. If the conductive soils are homogeneous, it can be deduced, therefore, that their thickness in the zones $S'_2$ and $S'_3$ is one-half their thickness in the zone $S'_1$, and that in the vicinity of the stations $S'_4$ and $S'_5$ this thickness is then only one-third of their thickness in the vicinity of the stations $S'_1$.

What I claim is:

1. In a method for investigating the earth's subsoil, the steps of obtaining indications of variations with time of potential differences produced by telluric currents flowing through the earth, between pairs of points lying along at least three angularly spaced apart axes, respectively, said axes intersecting one another in a common point, determining the total variation of potential difference for each of said pairs of points over a relatively long period of time, and plotting the total variation values thus determined along three axes identical with said angularly spaced apart axes, taking the point of intersection thereof as origin, the normals to the ends of said plotted values defining an ellipse to which said normals are tangent.

2. In a method for investigating the earth's subsoil, the steps of obtaining indications of variations with time of potential differences produced by telluric currents flowing through the earth, between at least two pairs of points lying along at least two angularly spaced apart axes, respectively, said axes intersecting one another in a common point, simultaneously obtaining indications as a function of time of a combination of the variations in potential difference between said two pairs of points, determining the total variation of potential difference for each of said pairs and for said combination over a relatively long period of time, plotting the total variations for said two pairs of points along axes identical with said two angularly spaced apart axes, taking the point of intersection as origin, and plotting the total variation for said combination along a third axis passing through said last-named origin, the normals to the ends of said plotted values defining an ellipse to which said normals are tangent.

3. The methods steps defined in claim 2 in which the combination of the variations in potential difference between the two pairs of points, of which indications are obtained, is the sum of said variations in potential difference.

4. The methods steps defined in claim 2 in which the combination of the variations in potential difference between the two pairs of points, of which indications are obtained, is the difference of said variations in potential difference.

5. A method for investigating the earth's soil in which the steps defined in claim 1 are repeated at a plurality of different locations, whereby information about the nature of the geological formations may be deduced by comparing the ellipses thus determined.

6. A method for investigating the earth's subsoil, comprising obtaining indications of variations with time of potential differences produced by telluric currents flowing through the earth, between a common point and at least two other points spaced substantially equal distances from said common point and lying on mutually perpendicular axes intersecting at said common point, simultaneously obtaining indications of variations with time in the sum of said potential differences, simultaneously obtaining indications with time of the difference of said potential differences, determining the total variation of potential difference for each of said two points with respect to said common point and for said sum and said difference over a relatively long period of time, plotting the total potential difference variation values for each of said two points with respect to said common point along first mutually perpendicular axes, taking the intersection thereof as origin, and plotting the total variation values for said sum and difference along second mutually perpendicular axes intersecting at said origin, one of said last-named axes bisecting the angle between said first mutually perpendicular axes, the normals to the ends of at least three of said plotted values defining an ellipse to which said normals are tangent.

GÉZA KUNETZ.

REFERENCES CITED

The following references are of record in the file of this patent:

UNITED STATES PATENTS

| Number | Name | Date |
| --- | --- | --- |
| 2,034,447 | Schlumberger | Mar. 17, 1936 |
| 2,440,693 | Lee | May 4, 1948 |